No. 830,019. PATENTED SEPT. 4, 1906.
F. SOMMERS.
BRIDLE.
APPLICATION FILED OCT. 21, 1905.
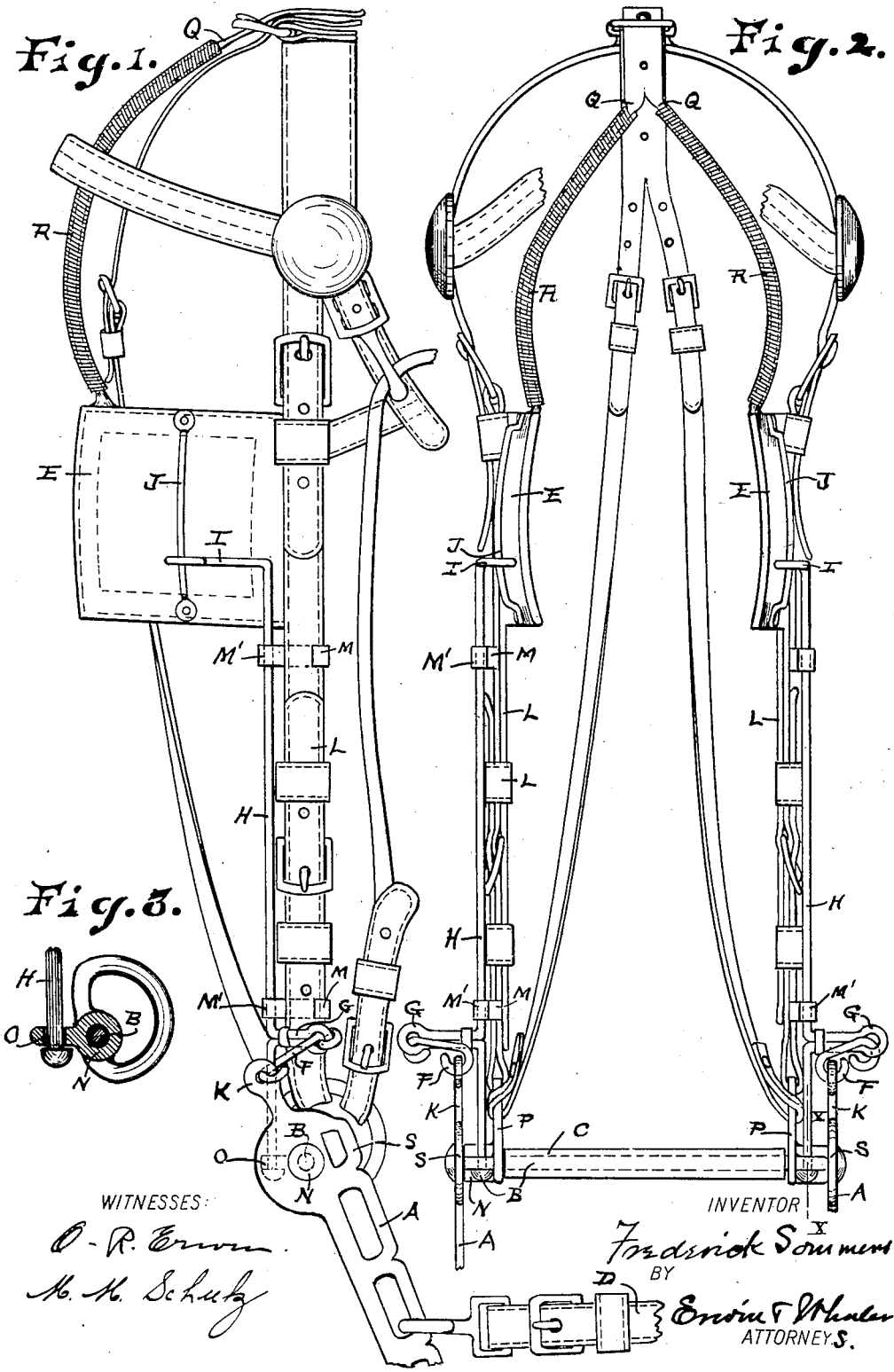

UNITED STATES PATENT OFFICE.

FREDERICK SOMMERS, OF MENOMONEE FALLS, WISCONSIN, ASSIGNOR OF ONE-HALF TO CHARLES MALSCH, OF SUSSEX, WISCONSIN.

BRIDLE.

No. 830,019.    Specification of Letters Patent.    Patented Sept. 4, 1906.

Application filed October 21, 1905. Serial No. 283,726.

*To all whom it may concern:*

Be it known that I, FREDERICK SOMMERS, a citizen of the United States, residing at Menomonee Falls, county of Waukesha, and State of Wisconsin, have invented new and useful Improvements in Bridles, of which the following is a specification.

My invention relates to improvements in bridles for horses. The object of my invention is to provide an attachment for bridles by which the driver of a horse may, in case the horse becomes frightened, cause the blinds of the bridle to be quickly thrown around in front of the horse's eyes, whereby the horse will be unable to see and whereby, as experience has proven, the horse will at once cease to run, and the danger of a horse running away when it becomes frightened from any cause is thereby avoided.

The construction of my device is explained by reference to the accompanying drawings, in which—

Figure 1 represents a side view of a bridle provided with my device for operating the blinds. Fig. 2 represents the front view thereof, and Fig. 3 is a detail drawn on line X X of Fig. 2.

Like parts are identified by the same reference-letters in all views.

The bridle proper is of ordinary construction.

My improved mechanism comprises, among other things, the two operating-levers A A, which are rigidly connected together by the transverse shaft B through the tubular bit C, which bit serves as a pivotal support for the shaft B, whereby as either one of said levers A are operated motion will be communicated therefrom to the other through said shaft B. Motion is communicated from the driver to the respective levers A through the reins D, whereby the horse is not only guided, but the blinds may also be operated. Motion is communicated from the levers A to the blinds E through the arms K, links F F, levers G G, vertical rods H H, transversely-arranged arms I I, and vertical loops J J, whereby as a person draws upon the reins D the blinds E are thrown forward toward each other and in front of the horse's eyes and whereby the horse is prevented from seeing the object at which it is frightened and for the reasons heretofore given is prevented from running. The vertical rods H H are connected with the respective sides L of the bridle by the bracket M M, one end of which bracket is rigidly secured to the sides L of the bridle, and the opposite ends are provided with loops M' for the reception of said rods H, in which they are adapted to turn on their longitudinal axis as the blinds are operated. The length of the vertical loops J is such as to permit of the adjustment of the bridles to fit horses of different sizes. It will be obvious that when the bridle is extended the arms I will be brought to the lower ends of the loops J. When, however, the bridle is contracted to fit a smaller horse, the arms I will be brought to the upper ends of said loops J. Thus it is obvious that said loops J permit of the required adjustment of the bridles for large and small horses. The lower ends of the vertical rods H are connected with the transverse shaft B through the horizontal sleeve N, which is loosely fitted to the shaft B, and the transverse arm O, in which arms said vertical rods H have loosely-fitted bearings. The tubular bit C and shaft B are connected with the respective sides L of the bridle by the links P P. The blinds E are respectively connected with the top of the bridle by the straps Q Q, and the straps Q are provided with spiral springs R R, which springs are compressed as said blinds are thrown toward each other and recoil as soon as said blinds are released from the action of the driver and throw the said blinds apart and away from the horse's eyes.

It will of course be understood that, if desired, separate reins may be used for guiding the horse, which may be connected more directly with the bit through the loops S S of the levers A, whereby the horse may be guided for all ordinary purposes without moving the blinds, and the separate straps D connected, as shown, to the outer ends of the levers A for the purpose of closing the blinds in case the horse becomes frightened. It will be understood, however, that the springs R may be sufficiently rigid to resist the action of the reins when used for the ordinary purpose of guiding or stopping the horse, with the lines D attached at the lower ends of the levers A, as shown in Fig. 1, and that said blinds will be closed only when an unusual strain is placed upon the driving-reins, as will be necessary in case the horse becomes frightened, and for this reason a single set of lines D will as a general rule serve the purpose of both guiding the horse and operating the blinds.

While I have shown the springs R located upon the exterior surface of the straps Q, it is obvious that the springs may, if desired, be inclosed within said straps.

Having thus described my invention, what I claim as new, and desire to secure by Letters Patent, is—

1. The combination of a tubular bridle-bit, means for connecting said bit with the respective sides of the bridle, a shaft extending longitudinally through said bridle-bit, transverse levers rigidly secured to the ends of said shaft, vertical rods connected at their lower ends with the respective ends of said shaft, means for communicating motion from the short arms of said transverse levers to said vertical rods, means for communicating motion from the upper ends of the vertical rods to the respective blinds of the bridle when desirous to close the same in front of a horse's eyes and means connected with said blinds for throwing them apart when released from the action of the vertical rods substantially as set forth.

2. The combination of a tubular bridle-bit, means for connecting said bit with the respective sides of the bridle, a shaft extending longitudinally through said bridle-bit, transverse levers rigidly secured to the ends of said shaft, vertical rods connected at their lower ends with said levers, means for communicating motion from said transverse levers to said vertical rods, means for communicating motion from the upper ends of said vertical rods to the respective blinds of the bridle when desirous to close the same in front of a horse's eyes, means connected with said blinds for throwing them apart when released from the action of the vertical rods, and means for adjustably connecting the upper ends of said vertical rods with the respective sides of said blinds to correspond with the adjustment of said bridle for large or small horses, substantially as set forth.

In testimony whereof I affix my signature in the presence of two witnesses.

FREDERICK SOMMERS.

Witnesses:
   JAS. B. ERWIN,
   O. R. ERWIN.